(No Model.)
W. R. WHIPPLE.
SURVEYING INSTRUMENT.
No. 519,010.
2 Sheets—Sheet 1.
Patented May 1, 1894.
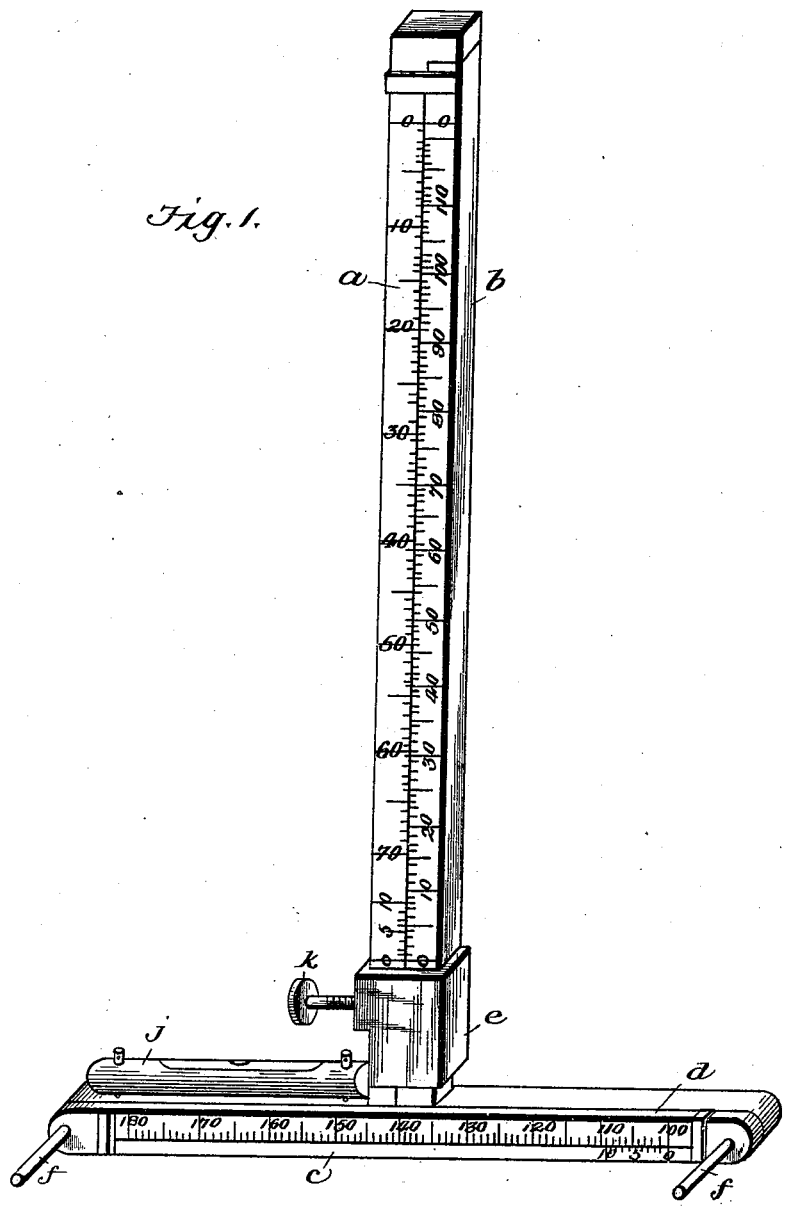

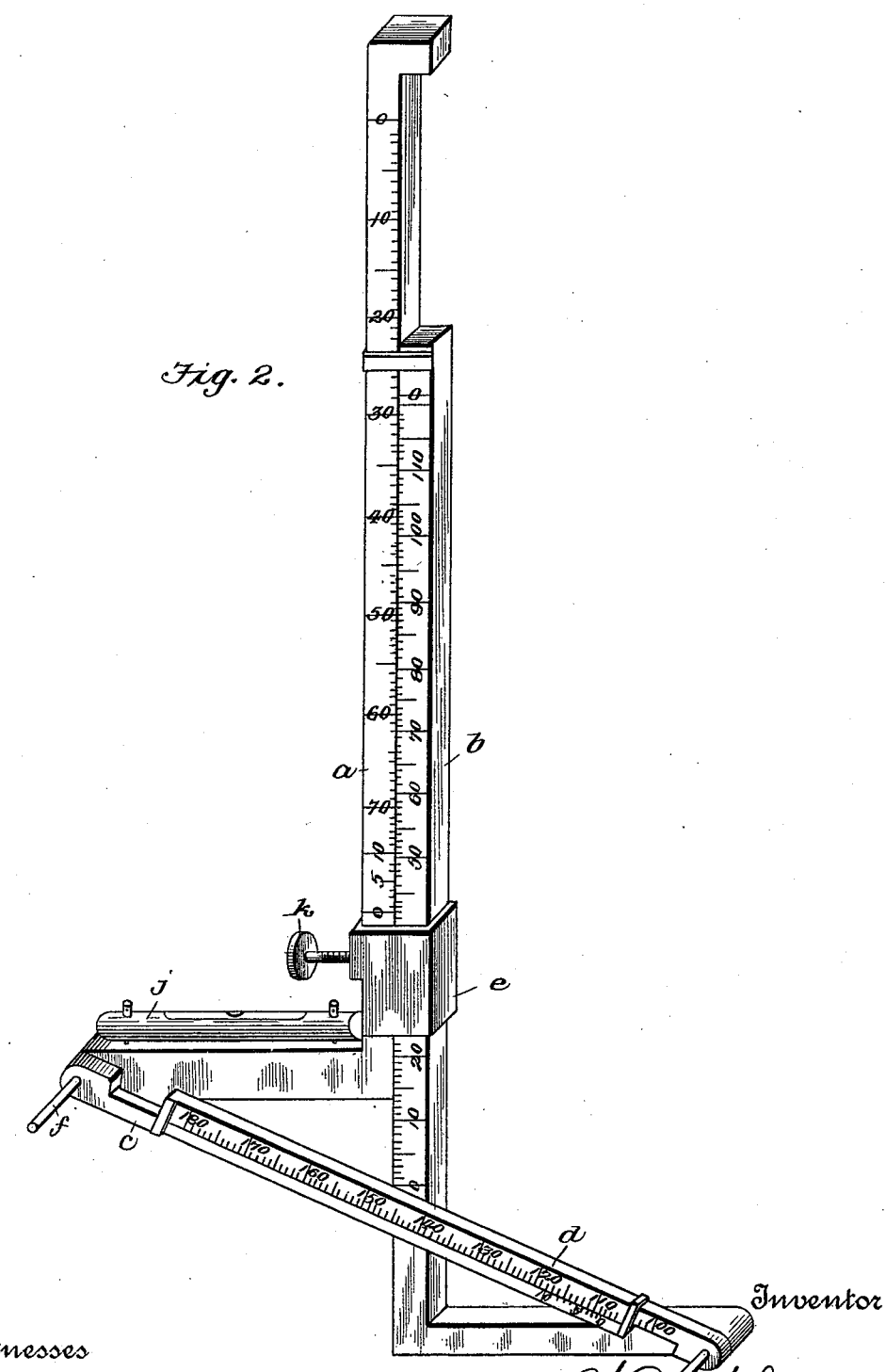

UNITED STATES PATENT OFFICE.

WILLIAM R. WHIPPLE, OF KELLOGG, ASSIGNOR OF ONE-HALF TO W. H. BYARS, OF PORTLAND, OREGON.

SURVEYING-INSTRUMENT.

SPECIFICATION forming part of Letters Patent No. 519,010, dated May 1, 1894.

Application filed July 18, 1892. Serial No. 440,437. (No model.)

*To all whom it may concern:*

Be it known that I, WILLIAM R. WHIPPLE, a citizen of the United States of America, residing at Kellogg, in the county of Douglas and State of Oregon, have invented a new and useful Surveying-Instrument, of which the following is a specification.

My invention is an instrument for measuring angles, heights, distances, &c., and it consists in a certain novel construction and combination of parts as will be hereinafter set forth.

In the annexed drawings, Figure 1 is a perspective view of my device showing it as it appears when folded and not in use, and Fig. 2 is a similar view showing the device adjusted for use.

Similar letters refer to similar parts throughout both views.

"$a$" and "$b$" represent the two bars bent and forming right angles.

"$c$" and "$d$" represent straight bars sliding upon each other and forming the hypotenuse of the right angle when formed.

"$e$" and $k$ represent a clamp screw to clamp "$a$" and "$b$" in any position desired.

"$f$" and "$f$" represent the sight pins.

"$j$" represents a spirit level attached to the instrument in order that the arms of the right angles "$a$" and "$b$" may be adjusted to a horizontal and perpendicular position.

The two squares ("$a$" and "$b$," Fig. 1) are made of any suitable material, brass, steel or aluminum preferred, each having one long and one short arm. They are placed together, back to back, forming the letter T inverted and are held in place by grooves, loops or slots in such a manner as to allow the longer arms to slide upon each other as is represented in Fig. 2. By the clamp screw "$e$," "$a$" and "$b$" may be held on each other at any point desired. Holes are drilled through the end of each of the short arms of the squares through which the sight pins "$f$" and "$f$" are driven, their distance apart from center to center being the unit of the scale represented on the verniers stamped on "$c$" and "$d$." These two pieces are made of the same material as the other parts and are one half the width of "$a$" and "$b$" except at each end where they are of equal width and are pierced by the sight pins as are the other two arms, of "$a$" and "$b$." They are also held in place by slots, loops or grooves and slide upon each other as is represented in Fig. 2. One of the pieces "$d$" is marked with a scale, the division of which is equal to one one-hundredth of the distance between the centers of the sight pins when in the position shown in Fig. 1 and is called the "hypotenuse scale;" the other has a vernier scale by means of which fractions of the spaces on "$d$" may be measured. By means of the level attached to "$a$" the short arms of the squares may be set horizontal and the long arms perpendicular.

One of the long arms of the square is marked with a scale, each division of which is equal to one of those on the "hypotenuse scale." The other long arm is marked with a vernier, divided into any scale desired, to read in feet or other denominations the maker may wish. The whole is attached to a staff, bar, tripod or other convenient support and is adjusted and swung into proper position as shown in Fig. 2.

The use of the instrument is various. It may be used in making accurate horizontal or perpendicular measurements, in surveying mountainous or hilly lands, to find the difference of altitude of any number of different points, to establish grades, to determine the per cent. of any grade or slope, to be used as a T square and protractor in the making of maps, plats or other drawings, to give the proper length of braces, &c., and is also useful in the solution of many mathematical problems. To determine the number of links necessary to measure, on any slope, to be equal to one hundred links on a level, set the instrument on the line to be measured, with the "hypotenuse scale" in the direction of the line. If ascending have the "$a$" bar ahead and "$b$" next the operator, but if descending reverse the instrument; swing the instrument until the level shows the short arms to be horizontal and the long arms perpendicular; clamp the instrument in place and slide "$b$" down along "$a$" until a line through the sight pins is parallel to the line of the slope to be measured; then the zero line on the bar "$c$" will be drawn out along the "hypotenuse scale"—measuring the hypotenuse of a similar triangle in hundredths and by the vernier in thousandths of the base. As the surveyor's chain is divided into one hundred links, and the scale between the sight pins is divided into one hundred equal divisions it will be apparent that each division may represent a link and the zero point will indicate the number of links—to tenths of a link—necessary to be chained on the given slope to equal a chain horizontally.

To further illustrate: If the instrument is brought into position as in Fig. 2, and the scale and vernier indicate that the sight pins' are one hundred and ten three-tenths spaces apart then it will require 110.3 links to be measured on that slope to be equal to one hundred links horizontal distance.

The scale and vernier on the long arms give the proportionate rise or fall of the slope in hundredths of the base.

If removed from its supports it becomes a very useful instrument as a T square or protractor—any angle being readily set off by the use of the verniers and a table of natural tangents and co-tangents.

What I do claim as my invention, and desire to secure by Letters Patent, is—

1. In an instrument of the character described, the combination of the L-shaped bars adjustably secured together, and an extensible measuring bar having its ends pivotally connected to the shorter arms of said bars.

2. In an instrument of the character described, the combination of the L-shaped bars, sight pins in the ends of the shorter arms of said bars, and an extensible measuring rod having its ends pivoted on said sight pins.

WILLIAM R. WHIPPLE.

Witnesses:
A. F. STEARNS,
W. B. HAMMITT.